M. L. Ballard,
Harvester Iron,
N° 31,284.  Patented Jan. 29, 1861.
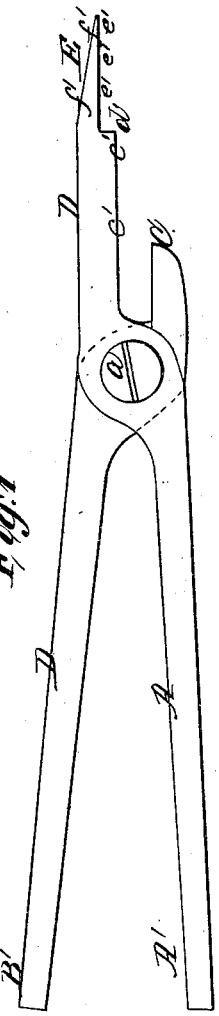
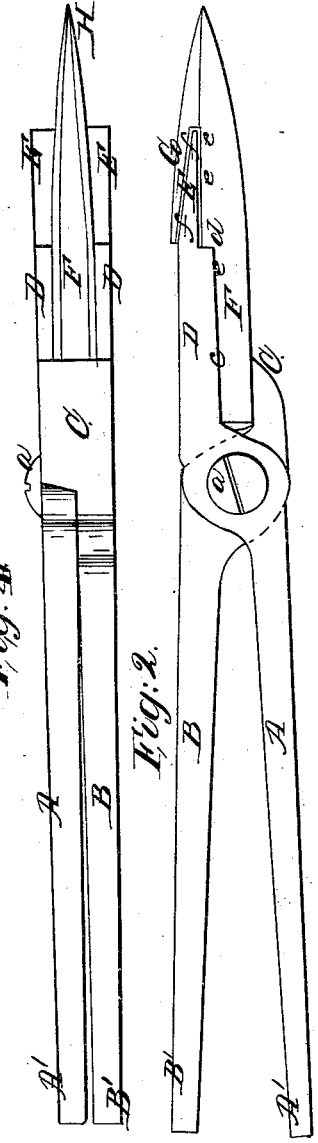
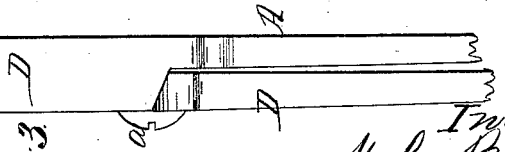
Witnesses:  
Inventor:  
M. L. Ballard  
By his Attorney  
Troy H. Dodge

UNITED STATES PATENT OFFICE.

M. L. BALLARD, OF CANTON, OHIO.

MAKING FINGER-GUARDS FOR HARVESTERS.

Specification of Letters Patent No. 31,284, dated January 29, 1861.

*To all whom it may concern:*

Be it known that I, M. L. BALLARD, of Canton, in the county of Stark, in the State of Ohio, have invented a certain new and useful Improvement in Guard-Finger Tongs; and I do hereby declare that the following is a full, clear, and exact description thereof, reference being had to the accompanying drawings, which form a part of this specification, and in which—

Figure 1, represents a side view of my improved device; Fig. 2, is a similar view with the guard grasped between the jaws as seen when the implement is in use; Fig. 3, represents a top view of Fig. 2, the rear ends of A, and B, being represented broken off; Fig. 4, represents a bottom view of Fig. 2, and Fig. 5, represents a top view of a complete guard.

The tongs are composed of three parts A, B, and $a$, the latter being the pivot or screw by which the parts A, and B, are held together.

The object of this invention is to facilitate the manufacture of wrought iron guards or fingers for reaping and mowing machines.

The operation is as follows: The guard or finger having been formed in any known manner with a shank F, lip G, point H, and shoulder $d$, is heated and then placed in the tongs as shown in Figs, 2, 3, and 4, when the workman takes hold of the ends A', and B', with one hand, whereby the jaws C, and D, are made to firmly grasp and hold the shank F, of the guard or finger, while with a hammer in the other hand the operator is enabled to accomplish the following at one heat: First, the surface $c$, of the shank F, is made even and true by being forced against the surface $c'$, of the jaw D; and the surface $e$, is also trued by the surface $e'$, of the tongue E, while the surfaces $c$, and $e$, are made parallel to each other, or in other words, are made to assume a certain fixed relative position. Second, the shoulder $d$, is formed of the same height as shoulder $d'$, on the jaw D. Third, the surface $f$, of the lip G, is made even and true, and also of the proper inclination, by being forced or hammered against the even and inclined surface $f'$, of the tongue E, of the jaw D. Fourth, the point H, of the guard is trued and properly beveled on its corners. It will thus be seen that the operator is enabled by the use of my "guard and finger tongs," to render the completion and final finish of wrought iron guards for reaping and mowing machines, perfect at one heat; and with such precision too, that the guards when completed and placed upon the finger-beam will all be so true, that the surface $e$, of each guard, upon which the cutters work, will be in the same horizontal plane. This is a great desideratum as is well known to those using harvesting machines.

The blue lines in Fig. 2, represent a thin layer of steel welded upon the guard before the lip G, is turned up, and which renders the guard more effective.

The mode of forming the different parts of the tongs, and of uniting the same, is fully shown in the drawings.

What I claim and desire to secure by Letters Patent—

As an improved article of manufacture, is the device above described, consisting of the part A, with its jaw D, shoulder $d'$, and inclined tongue E, in combination with the part B, with its jaw C, and pivot $a$, for the purpose of facilitating the manufacture of wrought iron guards or fingers for harvesters as set forth.

In witness whereof I have hereunto signed my name.

M. L. BALLARD.

Witnesses:
A. J. ALLEN,
DANIEL GOTSHALL.